United States Patent [19]

Kruse et al.

[11] 4,377,201

[45] Mar. 22, 1983

[54] ARRANGEMENT IN A HEAT RECOVERY UNIT

[75] Inventors: Rolf A. S. Kruse; Karl A. L. Gustavsson; Karl A. Jansson, all of Enköping, Sweden

[73] Assignee: Aktiebolaget Bahco Ventilation, Enköping, Sweden

[21] Appl. No.: 240,976

[22] Filed: Mar. 5, 1981

[30] Foreign Application Priority Data

Apr. 17, 1980 [SE] Sweden ............................. 8002896

[51] Int. Cl.³ ............................................. F28F 9/22
[52] U.S. Cl. .................................... 165/76; 165/166; 165/DIG. 12
[58] Field of Search ................. 165/76, 166, DIG. 12

[56] References Cited

U.S. PATENT DOCUMENTS 1,825,498  9/1931  Wogan ................................ 165/166
2,033,402  3/1936  Smith ................................. 165/166
3,224,842 12/1965  Manske ......................... 165/166 X
3,666,007  5/1972  Yoshino et al. ................... 165/166
4,051,898 10/1977  Yoshino et al. ................... 165/166

FOREIGN PATENT DOCUMENTS 2542136  3/1977  Fed. Rep. of Germany ...... 165/166

Primary Examiner—Sheldon J. Richter
Attorney, Agent, or Firm—Wegner, McCord, Wood & Dalton

[57] ABSTRACT

A heat recovery unit is adapted for installing in a cookery cupboard or the like space in a dwelling. Within a casing (3) the unit has a lamella heat exchanger (1), which is arranged on one corner edge and has two of its defining surfaces provided with openings for passages facing upwards and two downwards. The heat exchanger has its end walls (8) oriented in vertical planes. It is adapted for heating supply air (9, 10) through heat take-up from exhaust air (11, 12). Four vertical wall portions (13, 16) form a cross above the heat exchanger, thus providing four chambers for the ingoing and outgoing air flows (9-12). By means of portions airtightly sealed against the casing (3) and wall portions (13-17) the heat exchanger is divided into two portions, each having a cross-stream course between supply air (9, 10) and exhaust air (11, 12), with its passages for supply air and exhaust air arranged in series with the corresponding passages of the other portion. The heat exchanger is removable as a unit after opening the front (21) of the casing.

7 Claims, 6 Drawing Figures

ARRANGEMENT IN A HEAT RECOVERY UNIT

DESCRIPTION

The invention relates to an arrangement in a heat recovery unit adapted for installation in a cookery cupboard or the like space in a dwelling. Inside a casing, the unit is provided with a lamella heat exchanger in an attitude such that it is oriented with two of its surfaces upwards and two downwards, said surfaces being those defining openings of passages through the heat exchanger, which also has its end walls disposed in vertical planes. The heat exchanger is also adapted for heating incoming outside air by taking heat from outgoing air departing from the dwelling.

Such an arrangement is known from the Swedish patent application No. 7713836-0.

A strong desire in such an arrangement is to provide the greatest possible degree of recovery. At the same time, there is a problem with relation to the connections on the unit for the air flows to and from the premises and to and from the outside air. With regard to the space for ducting, all four connections must be situated upwards on the unit, while the space inside the unit needs to be utilized to the greatest possible extent for the heat exchanger.

The object of the invention is therefore to get all four connections for the air flows situated above the heat exchanger, using means which are simple and do not require much space, at the same time arranging space for generous heat exchanging surface and advantageous flow for the air flows through the heat exchanger with respect to the flow rate required for good heat exchange and the desirable temperature difference for the effective passage of heat between the flows.

The intended result is obtained by the arrangement being given the characterizing features apparent from the following patent claim 1.

This solution also affords good possibilities of making the heat exchanger easy to take out for cleaning without hazard to the sealing between the different air flows.

An embodiment of the invention will now be described in detail while referring to the appended drawings.

Figure 1:
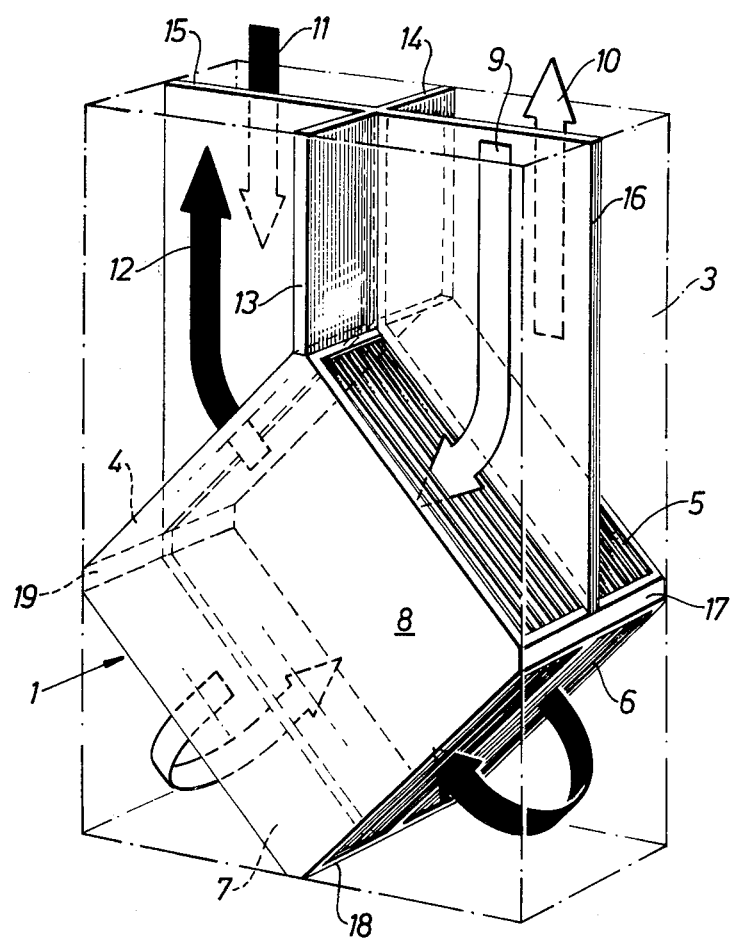
FIG. 1 is a schematic view of the heat exchanger in the arrangement, seen obliquely from above with the air flow paths shown.
Figure 2:
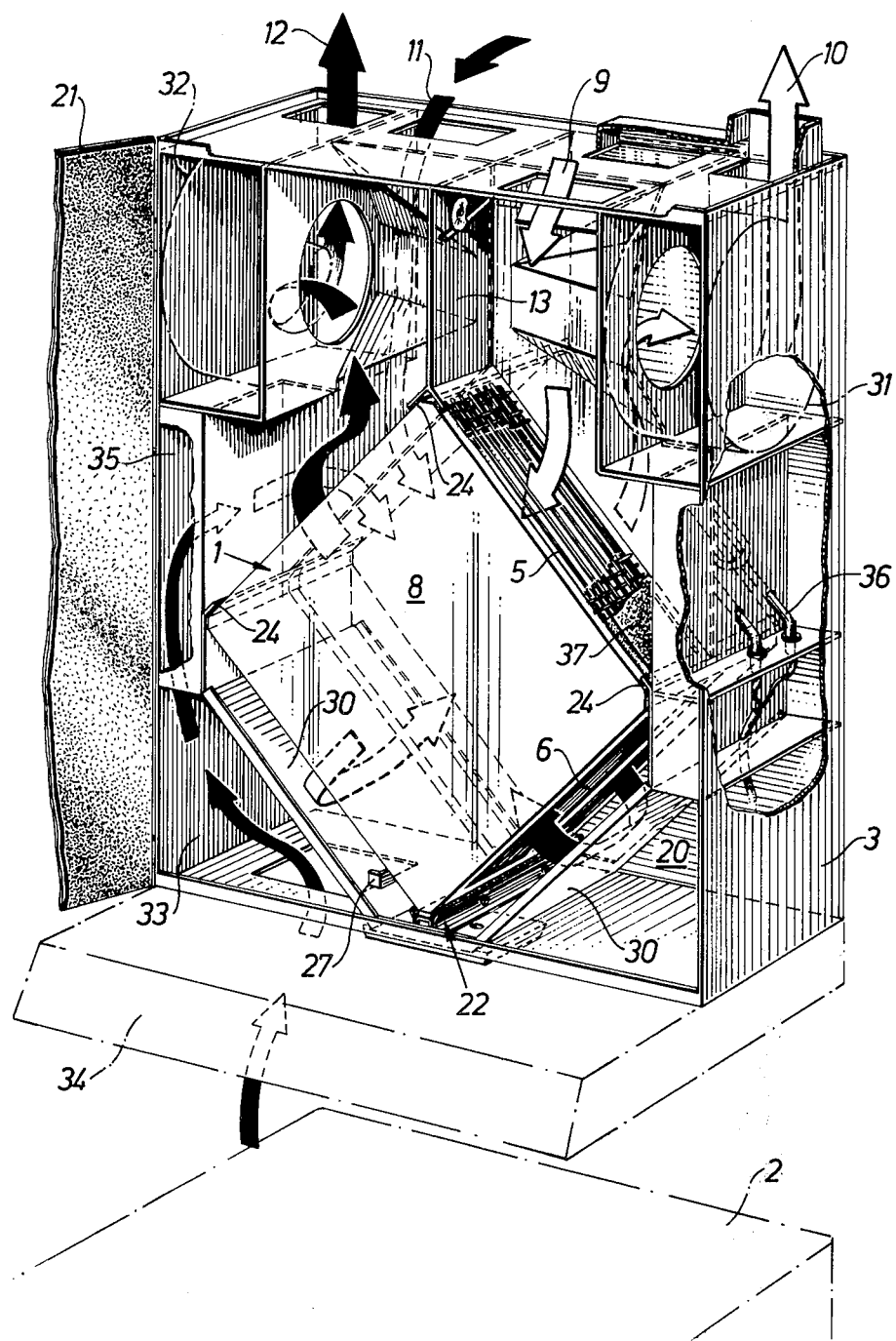
FIG. 2 is a detailed cutaway view of a complete heat exchanger unit, placed above the oven in the kitchen of a dwelling.

The orientation and flow paths for the heat exchanger 1 are schematically presented in FIG. 1, and are depicted in FIG. 2 in more detail in a practically applicable embodiment relating to a heat recovery unit adapted for installation above an oven 2 in the kitchen of a dwelling. The heat exchanger is arranged inside a casing 3 contained in, or consisting of a cupboard above the oven 2.

The heat exchanger 1 is made as a lamella heat exchanger with alternate passages between adjacent lamellae assigned to a flow path cross-streams to the flow path of the intermediate passages. The heat exchanger thus has four defining surfaces 4–7, having openings for said passages. It has two such defining surfaces 4 and 5 facing upwards and the remaining two, 6 and 7 facing downwards, since it is placed on one corner edge. Its end walls 8, which are parallel to the heat exchanger lamellae, are thus oriented in vertical planes. The heat exchanger is illustrated as being a substantially right parallelepiped, with defining surfaces 4–7 localized consecutively in four side planes with the boundary lines therebetween consequently situated along intermediate corner edges.

A flow of supply air to the dwelling is taken in as fresh or outside air 9 and is heated in the heat exchanger to a warm flow 10 through heat take-up from flow of departing exhaust air from the dwelling, this flow coming into the heat exchanger as a warm flow 11 and leaving it as a cooled flow 12 of exhaust air.

As will be most clearly seen from FIG. 1, four vertical wall portions 13–16 are arranged, forming together a cross in horizontal section. These wall portions are situated above the heat exchanger 1. Two such portions, 13 and 14, join onto the heat exchanger along a boundary line between both upwardly facing defining surfaces 4 and 5. The other two wall portions, 15 and 16, join onto the same defining surfaces 4 and 5 such that they divide the respective defining surface in half.

The four wall portions 13–16 have sealing connection with the surrounding walls of the casing 3, thereby forming together with the casing four chambers, of which the first constitutes an inlet chamber for the exhaust air 11 from the dwelling, the second an outlet chamber for the exhaust air 12 cooled in the heat exchanger, the third an inlet chamber for the untreated, fresh, supply air 9 and the fourth an outlet chamber for the supply air 10 heated in the heat exchanger. The heat recovery unit is hereby upwardly connectable to the necessary, (not shown) ducting to and from separate rooms in the dwelling, as well as to and from the outside air.

Along its boundary lines 17, 18 and 19 between the defining surfaces 4–7 the heat exchanger is sealed airtight against the casing 3. These sealing locations are schematically marked in FIG. 1, and it will be seen from FIG. 2 how the sealing can be provided via intermediate constructional details. The wall portions 15 and 16 (see FIG. 1) are also downwardly sealed against the heat exchanger 1.

The heat exchanger and walls 8 are adapted for engaging tightly against the back 20 of the casing and against its front 21 when the latter, which is formed as a hatch, is in a closed position.

By means of the wall portions 13–16 and the seals against the casing 3, the heat exchanger is consequently divided into a front and a rear portion, each having a cross-streams flow pattern between supply air 9, 10 and exhaust air 11, 12, with its passages for supply air and exhaust air disposed in series with the corresponding passages of the other portion. This is most clearly apparent from FIG. 1. The incoming, cold, supply air 9 goes obliquely down through the forward portion of the heat exchanger from right to left cross-steams to the exhaust air, the latter already having passed through the rear portion of the heat exchanger to come into the forward portion downwards to the right, and depart upwards to the left as a cooled exhaust air flow 12. The flow of supply air thus heated is led downwards to the left, and to the rear portion of the heat exchanger, and for further heating is led obliquely upwards to the right through this portion, which is thus coupled in series, cross-streams to the flow of warm exhaust air 11 coming in upwards to the left from the dwelling, and departs upwards to the right as a heated supply air flow 10. After having given up a part of its heat in the rear portion of the heat exchanger, the incoming exhaust air flow 11 arrives at the series-connected space downwards to the right, and continues through the front heat exchanger portion, as already described.

As have been already noted from the above account of the flow paths, the flow directions for the air flows are selected in the illustrated embodiment such that a counter-stream course is obtained in respect of the air movement between both portions of the heat exchanger, i.e. the coldest air flow is taken to one portion and the warmest air flow to the opposite portion.

The heat exchanger 1 is made as a unit, and after opening or removing the front 21 it can be taken out of and put into the casing 3. In order to ensure the seal, the airtight connection between the casing 3 along the bottommost situated boundary line 18 between the defining surfaces of the heat exchanger, namely that between the surfaces 6 and 7, comprises a raisable and lowerable support and guide means 22 for the heat exchanger. The support and guide means 22 has sealing elements 23 which are pressed against the heat exchanger when said means is in a position lifting up the heat exchanger, in which the heat exchanger in turn is pressed against the upwardly disposed sealing means 24, which are in the form of flanges provided with elastic sealing strips, and arranged on the lower edge of the wall portions 13, 14 and on details in the casing 3.

Figure 3:
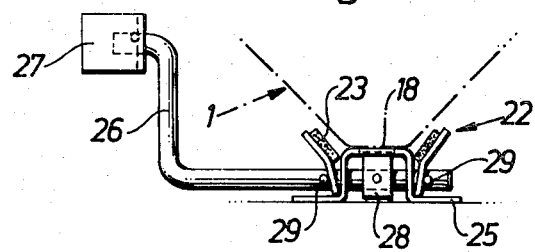
FIG. 3 is a partial front view showing a raisable and lowerable support and guide means for the heat exchanger in the unit according to FIG. 2.
Figure 4:
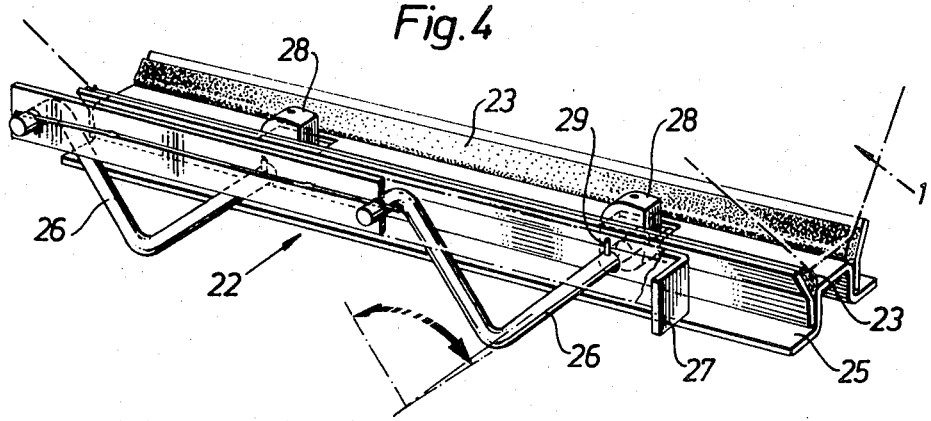
FIG. 4 is a partial view of the support and guide means according to FIG. 3, seen obliquely from above.

As will be seen from FIGS. 3 and 4, the support and guide means 22 comprises a rail 25, which is hat-shaped in section and attached to a bottom member of the casing with an orientation along the lower corner edge 18 of the heat exchanger. A pair of crank-like elements 26 are arranged transverse the rail, mounted therein and mutually connected by means of an operating bar 27 which is accessable through the front opening (see FIG. 2) of the casing. Eccentric lifting pads 28, unrotatably mounted on the element 26 are sunk into the rail and are turnable for raising and lowering the heat exchanger by manual actuation of the operating bar 27. The sealing elements 23 are tiltably mounted on the crank-like elements 26, one on each side of the rail 25. Each element comprises a rail provided with a strip of elastic sealing material facing towards the heat exchanger. Pegs 29 on the element 26 are pressed against the sealing elements 23 to bring them into engagement against the heat exchanger 1 when the element 26 is turned for lifting the heat exchanger.

The removable front 21 (see FIG. 2) of the casing 3 is internally clad with resilient sound-insulating material. In the closed position of the front, this insulating material also serves as sealing against the parts on the inside of the front in direct contact therewith and separating the air paths in the unit, said parts being dependent for their separating function on such sealing. These parts are, for example, the heat exchanger's forward end wall 8, wall portion 13 separating incoming outside air 9 from outgoing exhaust air 12, and baffles 30 at both bottom corners of the unit, separating reversing ducts adjacent the heat exchanger 1 for exhaust air and supply air in order to utilize the outer corner portions of the unit for other purposes.

It will also be seen from FIG. 2 that the spaces in both upper corners of the unit are intended for a supply air fan 31 and an exhaust air fan 32, both of the radial type. The fans have their suction sides directly connected to the outlet chambers above the heat exchanger for supply air 10 and exhaust air 12.

The space 33 in the downward left-hand corner of the unit, partitioned off by the baffle placed there, is utilized according to FIG. 2 for the connection of an oven cowl 34, situated under the unit casing 3, to the inlet chamber for the exhaust air 11 from other areas in the dwelling. The air departing from the kitchen via the oven cowl reaches said chamber via a duct 35 which is arranged transverse the heat exchanger 1 within the casing 3. On the opposite side of the heat exchanger, a space corresponding to the duct 35 is utilized, inter alia, for attaching and connecting a supplementary heating element 36 projecting into the outlet chamber for the supply air 10, this element serving to further heat the supply air flow if need be. The heat exchanger is laterally sealed against the casing 3 via the wall of the duct 35 and a corresponding wall surrounding the space on the opposite side.

All connections to unillustrated ducts to and from other rooms and to and from the outside air are situated in the upper section of the casing 3. The wall portions 15 and 16, illustrated schematically in FIG. 1 as flat, have curving portions in a practical embodiment according to FIG. 2, these portions permitting space-saving connection of the respective outlet chamber to the inlet of its fan. Each fan wheel has its motor (not shown) placed on the inside of its fan housing, and as an exterior rotor motor.

An air filter 37 is placed above the inlet of the heat exchanger 1 in the inlet chamber for the outside air 9, and is accessible when the front 21 is swung out or removed.

Figure 5:
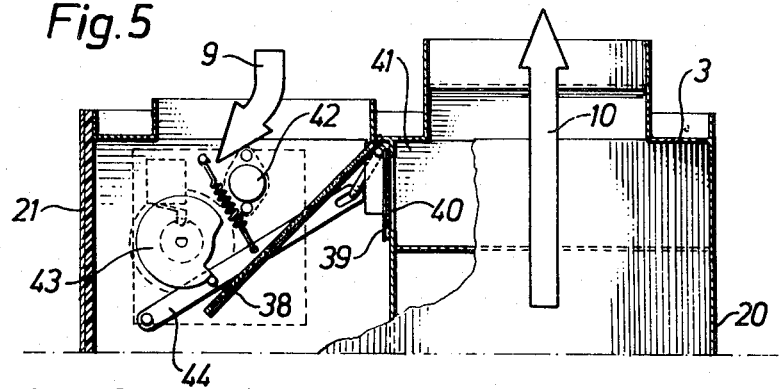
FIG. 5 is a partial view illustrating a flap mechanism in the upper part of the unit according to FIG. 2. The two flap blades of the mechanism are shown in the latter figure in a position for normal operation of the heat exchanger unit.
Figure 6:
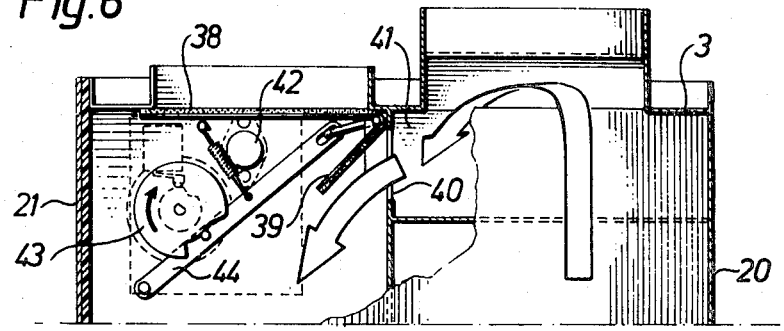
FIG. 6 is a partial view corresponding to the view in FIG. 5, but with the flap blades reset for defrosting the heat exchanger by circulating a flow of air through the incoming air supply passages of the heat exchanger.

To defrost the heat exchanger when ice forms in its exhaust air passages, the inlet and outlet chambers for supply air are provided with a flap mechanism as will be seen from FIGS. 5 and 6. In FIG. 5 the flap mechanism is depicted as for normal operation of the heat exchanger. A flap blade 38 is adapted at an angle and rigidly connected to a second flap blade 39. The flap blade 38 is normally open to allow the outside air flow 9 passage through the opening in the upper section of the casing 3 intended therefor, whereas the blade 39 is in a position to close off an opening 40 between an outlet passage 41 for the heated supply air after the supply air fan 31 and the inlet chamber for outside air 9.

A thermostat 42 is placed in the inlet chamber for the outside air. When the temperature goes below a predetermined temperature, with the risk of frost formation in the exhaust air passages in the heat exchanger, the thermostat gives an initiating impulse to a low-geared motor (not shown) which drives a cam 43. A recess in the cam gives space for a cam follower on a lever 44 to allow movement of the lever inwards towards the centre of the cam, actuated by a tension spring, as illustrated in FIG. 6, whereby one end of the lever actuates a crank on the common shaft of the flap blades 38 and 39, to reset the positions of the blades, so that the blade 38 closes the casing opening to the outside air and the blade 39 opens the opening 40 so that a circulation flow is obtained from the inlet chamber through the forward and rear portions of the heat exchanger, through the outlet chamber, fan 31, outlet passage 41 and opening 40 and back again to the inlet chamber.

If so required, the element 36 can also be adapted for coupling in to hasten the defrosting process.

By means of a further cam, situated behind the cam 43, and indicated by broken lines in FIGS. 5 and 6, and a cam follower being associated with a microswitch, current is obtained for maintaining operation of the motor until the cam 43 resets the flap blades in the position according to FIG. 5, independent of whether the thermostat has ceased to signal for defrosting. As long as the thermostat signals for defrosting, the cam rotates however, and resets the flap blades for circulation for a given time per revolution.

We claim:

1. An arrangement in a heat recovery unit adapted for installation in a cooking cupboard or the like space in a dwelling, the unit having within a casing a lamella heat exchanger placed on one corner edge such that two of its surfaces face upwards and two face downwards, said surfaces being the defining surfaces of the openings of passages through the heat exchanger, which has its end walls oriented in vertical planes, whereby said heat exchanger is adapted for heating outside or fresh air serving as supply air by removing heat from exhaust air departing from the dwelling, characterized in that four vertical wall portions, together forming a cross in horizontal section, are adapted above the heat exchanger and connect to it such that two of the wall portions follow a boundary line between both said upwardly facing defining surfaces on the heat exchanger while both the other of the wall portions respectively divide the same defining surfaces so that the four wall portions form four chambers, the heat exchanger having three additional boundary lines between adjacent defining surfaces with each boundary line making a sealing connection with the contiguous wall of the casing, the first chamber constituting an inlet chamber for the exhaust air from the dwelling, the second an outlet chamber for such exhaust air cooled in the heat exchanger, the third an inlet chamber for untreated supply air in the form of fresh or outside air and the fourth an outlet chamber for the supply air heated in the heat exchanger, whereby the heat recovery unit is upwardly connectable to necessary ducting to and from separate rooms in the dwelling and to and from the outside air the heat exchanger also being air-tightly sealed against the casing with its end walls sealingly engaging against the back and front of the casing, whereby said heat exchanger, which is formed as a unit and is insertable and removable by opening or removing the front, is divided into two portions, each of which has a cross-streams relationship between supply air and exhaust air and has its passages for supply air and exhaust air disposed in series with the corresponding passages of the other portion.

2. Arrangement as claimed in claim 1, characterized in that the flow directions for the supply air and exhaust air through the heat exchanger are selected such that a counterflow situation is obtained with relation to the air movement between both said portions of the heat exchanger.

3. Arrangement as claimed in claim 1, characterized in that the airtight sealing against the casing along the bottom-most situated of the heat exchanger's boundary lines separating the downwardly facing defining surfaces comprise a raisable and lowerable support and guide means for the heat exchanger, with sealing elements maintaining the seal when said means is in an uplifted position, in which the heat exchanger is pressed against stationary sealing means situated above it along the remaining three boundary lines.

4. Arrangement as claimed in claims 1, 2 or 3, characterized in that the casing's front, which can be swung out or removed, is interiorly clad with resilient, sound-insulating material, in the closed position of the front also serving as sealing against interior parts directly in contact therewith and separating the air paths, said parts being such as the one end wall of the heat exchanger, and one of the four vertical wall portions forming cross.

5. Arrangement as claimed in any of claim 1, characterized in that the heat exchanger substantially has the form of a right parallelpiped with said defining surfaces localized in sequence to four of its side planes and said boundary lines being consequently situated along intermediate corner edges between said planes.

6. Arrangement as claimed in any of claim 1, characterized in that a supply air fan and an exhaust air fan are arranged inside the casing being accommodated in said chambers, said supply air fan having its suctions side directly connected to the outlet chamber for the heated supply air and the exhaust air fan its suction side directly connected to the outlet chamber for the cooled exhaust air.

7. Arrangement as claimed in any of the claim 1, characterized in that an oven cowl adapted under the heat recovery unit has its exhaust air duct connected to the outlet chamber for the exhaust air via a passage arranged inside the casing.

* * * * *